UNITED STATES PATENT OFFICE.

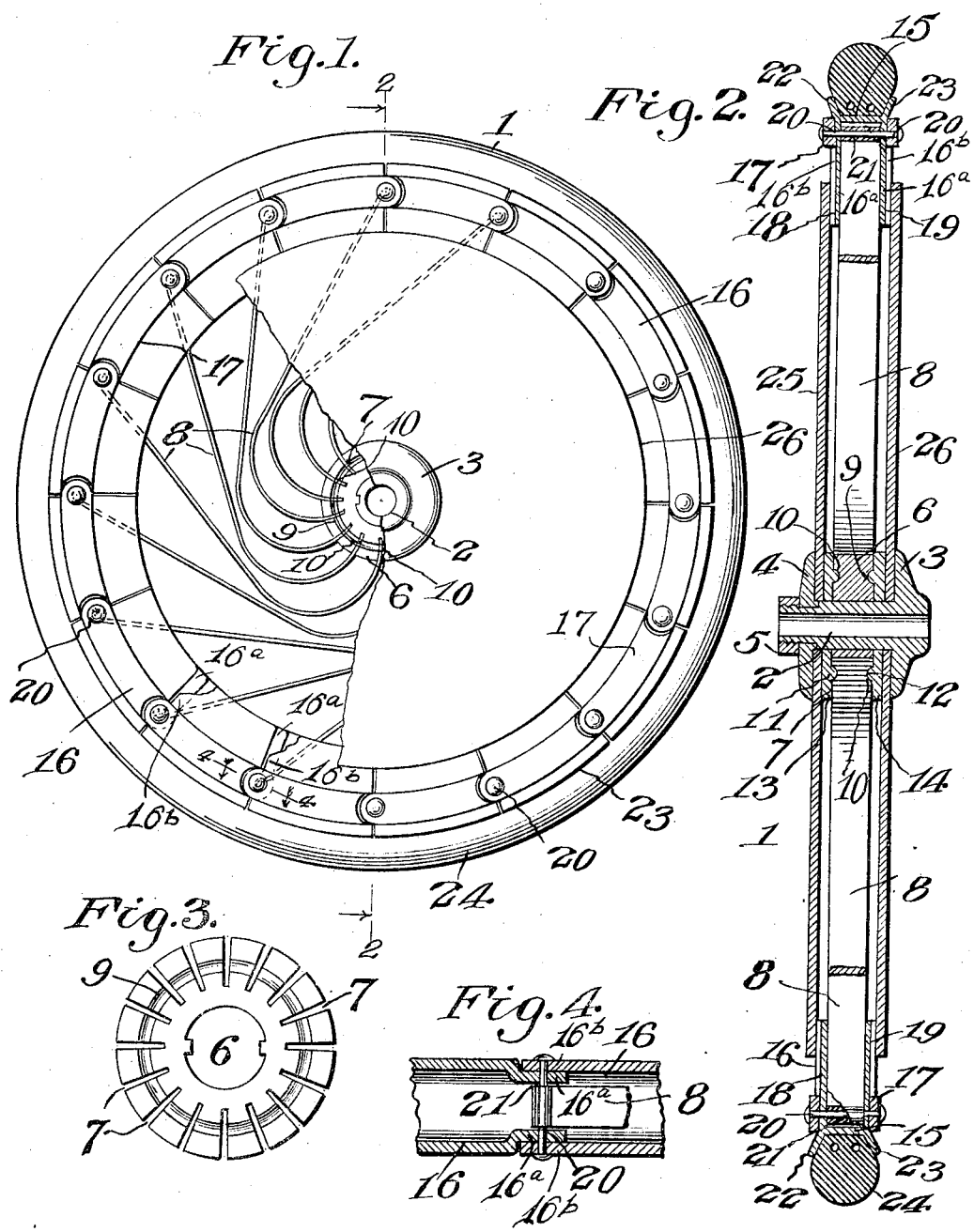

JOSEPH R. PLACE, OF HARVEY, ILLINOIS.

SPRING-WHEEL.

953,549.

Specification of Letters Patent.  Patented Mar. 29, 1910.

Application filed May 17, 1909. Serial No. 496,339.

*To all whom it may concern:*

Be it known that I, JOSEPH R. PLACE, a citizen of the United States, residing at Harvey, in the county of Cook and State of Illinois, have invented certain new and useful Improvements in Spring-Wheels; and I do declare the following to be a full, clear, and exact description of the invention, such as will enable others skilled in the art to which it appertains to make and use the same.

This invention relates to an improved spring wheel and the object thereof is to provide a simply constructed and efficient wheel of this class provided with a flexible rim or channel resiliently connected with the hub and means for limiting the yieldability of the wheel.

With the foregoing and other objects in view, the invention consists of certain novel features of construction, combination and arrangement of parts, as will be more fully described and particularly pointed out in the appended claims.

In the accompanying drawings, Figure 1 is a side elevation of a portion of a wheel constructed in accordance with this invention, with parts broken out; Fig. 2 is a transverse vertical section thereof; Fig. 3 is a detail side elevation of the socket member of the hub detached; Fig. 4 is an enlarged detail transverse section through the rim or channel taken on the line 4—4 of Fig. 1.

In the embodiment illustrated, a wheel 1 is shown having a hub 2 provided at one end with an integral plate 3 and at its other end with a removable plate 4 secured in position by means of a nut 5 secured to the outer end of the hub for locking the various parts of the wheel in assembled position. A socket member 6 is keyed to the hub 2 midway the ends thereof and is provided with a plurality of radially extending slots 7 to receive spring spokes 8 which are made in the form of plate springs and have one end thereof arranged in the slots 7 of the socket member 6 and their other end detachably connected with the rim, as will be hereinafter described. The hub member 6 and the springs 8 are provided on opposite sides with registering grooves or notches 9 and 10 which form annular channels on opposite sides of the hub member to receive annular ribs 11 and 12 formed on the inner faces of washers 13 and 14 whereby the springs and socket member are locked together.

A channeled rim 15 is mounted on the outer ends of the springs 8 and is composed of a plurality of pivotally connected sections, as 16, provided with laterally spaced inwardly extending flanges 18 and 19. One end 16ᵃ of each section fits inside the adjacent end 16ᵇ of the other and is offset and overlapped by said end 16ᵇ, as is clearly shown in Figs. 1, 2 and 4 and by means of which dirt is prevented from working into the interior of the wheel. These segmental sections 16 are provided near their periphery or outer edges with shoulders, as 17, which, when the parts are assembled, form a continuous shoulder around the outer faces of the wheel which are adapted to be engaged by the periphery of the casing plates hereinafter described to limit the inward movement of these rim sections to prevent the breakage of the springs. Springs 8 extend between the flanges 18 and 19 and are connected with the rivets, as 20, which connect the sections. The free ends of these springs are provided with eyes, as 21, through which the rivets 20 are designed to pass to hold them in operative position. The sections 16 are also provided with laterally spaced longitudinally extending outwardly projecting flanges 22 and 23 to form a seat for the tire 24 which is preferably made of hard rubber.

Plates 25 and 26 are provided with central apertures adapted to fit over the hub 2 on opposite sides of the wheel and are clamped between the plates 4 and 3, and the washers 13 and 14, respectively, the outer free edges of said plates extending on opposite sides of the flanges 18 and 19 of the rim sections to provide guides for said flanges and the edges of which are adapted to engage the shoulders 17, as hereinbefore described, to limit the inward movement of said rim sections relatively to said plates.

It will thus be evident, when it is desired to remove a spring 8 for any reason, all that is necessary is to unscrew the nut 5 and remove the plate 4 from the hub and the plate 25 whereby a spring may be readily detached by slipping out the rivet which connects its outer end to the rim and a new spring may be inserted without removing the rubber tire or separating any of the other parts of the wheel.

From the foregoing description, taken in connection with the accompanying drawings, the construction and operation of the invention, will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

A spring wheel comprising a channeled rim composed of a plurality of segmental sections, each having flanges extending inwardly from its opposite edges, shoulders arranged on the outer faces of said flanges, one end of one section overlapping the adjacent end of the adjacent section, a pivot extending transversely through said overlapping portions, a hub, plate springs connected at one end to said pivots and at their other end to the hub, and a tire arranged in the channel of said rim and plates arranged on opposite ends of said hub with their outer free edges extending on the opposite sides of said flanges and spaced from the shoulders thereon to provide guides for the flanges and stops for limiting the inward movement of the rim sections.

In testimony whereof I have hereunto set my hand in presence of two subscribing witnesses.

JOSEPH R. PLACE.

Witnesses:
 KATIE E. PLACE,
 H. M. SCOTT.